United States Patent
Musabeyoglu et al.

(10) Patent No.: US 11,605,254 B1
(45) Date of Patent: Mar. 14, 2023

(54) TAMPER DETECTION FOR BEACONS USING RADIO FREQUENCY TAGS

(71) Applicant: Amazon Technologies, Inc., Seattle, WA (US)

(72) Inventors: Ahmet Musabeyoglu, Sunnyvale, CA (US); Xingang Guo, Clyde Hill, WA (US); Kaushik Mani, Seattle, WA (US); Jin Li, Sammamish, WA (US); Taru Roy, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 518 days.

(21) Appl. No.: 16/125,274

(22) Filed: Sep. 7, 2018

(51) Int. Cl.
  *G07C 9/28* (2020.01)
  *G07C 9/00* (2020.01)
  *G06K 7/10* (2006.01)
  *G06K 19/07* (2006.01)

(52) U.S. Cl.
  CPC ........... *G07C 9/28* (2020.01); *G06K 7/10297* (2013.01); *G06K 19/0723* (2013.01); *G07C 9/00182* (2013.01)

(58) Field of Classification Search
  CPC ............ G07C 9/00111; G07C 9/00182; G06K 7/10297; G06K 19/0723
  USPC ...................................... 340/5.7, 5.72, 5.64
  See application file for complete search history.

(56) References Cited

U.S. PATENT DOCUMENTS

| | | | | |
|---|---|---|---|---|
| 9,959,434 | B1 * | 5/2018 | Ng | G06Q 10/00 |
| 2006/0109117 | A1 * | 5/2006 | Hsu | G06F 21/554 |
| | | | | 340/571 |
| 2006/0261959 | A1 * | 11/2006 | Worthy | G08B 25/10 |
| | | | | 340/573.4 |
| 2008/0278325 | A1 * | 11/2008 | Zimman | G06F 21/32 |
| | | | | 340/572.1 |
| 2010/0127821 | A1 * | 5/2010 | Jones | G07C 9/00309 |
| | | | | 340/5.2 |
| 2014/0109631 | A1 * | 4/2014 | Asquith | E05B 45/005 |
| | | | | 70/15 |
| 2014/0258132 | A1 * | 9/2014 | Swamy | G06K 7/0004 |
| | | | | 705/67 |
| 2015/0098631 | A1 * | 4/2015 | Palmer | G06K 9/00288 |
| | | | | 382/118 |

(Continued)

OTHER PUBLICATIONS

PRWeb, "SecureRF Announces Secure NFC Tag for the Internet of Things Featuring PKI Authentication", Jan. 20, 2015, 3 pages, <http://www.prweb.com/releases/2015/securenfctag/prweb12452305.htm>.

(Continued)

*Primary Examiner* — Yong Hang Jiang
(74) *Attorney, Agent, or Firm* — Patterson + Sheridan, LLP (57) ABSTRACT

Embodiments herein describe a beacon that is used to verify a location of a user and provide access to a secure location (e.g., a locked building). The beacon includes a radio frequency reader which communicates with a tag (e.g., an NFC or RFID tag) disposed on a same surface as the beacon. For example, the beacon may cover the tag on the surface (e.g., a wall next to a locked door or access point into the secure location). The reader in the beacon can periodically perform a read cycle to identify the presence of the tag to ensure the beacon has not been removed. If during one or more cycles the reader does not detect the tag, the beacon can deactivate the beacon and no longer transmit the location verification code.

11 Claims, 5 Drawing Sheets

(56) References Cited

U.S. PATENT DOCUMENTS

2016/0300401 A1\* 10/2016 Povolny ................. G08G 1/017
2017/0178477 A1\* 6/2017 Turgeon ............. G08B 13/2417
2019/0026753 A1\* 1/2019 White ................ G06K 7/10297
2020/0364530 A1\* 11/2020 Ionescu ............ G06K 19/07758

OTHER PUBLICATIONS

NFC World, "RapidNFC shows off tamper-proof tags", May 8, 2015, 6 pages. <https://www.nfcworld.com/2015/05/08/335142/rapidnfc-shows-off-tamper-proof-tags/>.

\* cited by examiner

TAMPER DETECTION FOR BEACONS USING RADIO FREQUENCY TAGS

BACKGROUND

The present invention relates to tamper detection for beacons used when accessing secure buildings.

A delivery person often has packages that need to be delivered in a secure building (e.g., a building with a locked door). For example, the building may be a multi-tenant building such as a building with different offices or an apartment building. Rather than attempting to contact the tenant to unlock the door, the delivery driver could use an application to request entry based on her location and known identify. For example, the application may verify that the delivery driver is a trusted person, verify she is currently at the building, and then provide a code for accessing the building (e.g., unlocking the door).

The application can verify the location of the delivery person using global position satellite (GPS) signals. However, GPS signals in some devices (e.g., mobile phones or tablets) can be spoofed or faked to trick the application into determining that the user is at the building when in fact she is not. By spoofing the GPS signals provided to the application, a person can trick the application into determining the person is at the building, and thus, opening the door.

DETAILED DESCRIPTION

Embodiments herein describe a tamper proof beacon that is used to verify a location of a user (e.g., a delivery person) and provide access to a secure location (e.g., a locked building). As mentioned above, GPS signals can be spoofed which means an access application on a mobile device may believe the device is at a different location than its actual location. Instead of relying on GPS signals, the beacon can be used to verify the current location of the mobile device (and the location of the delivery person). The beacon may include a limited range transmitter (e.g., a Bluetooth® low energy (LE) compatible transmitter, a ZigBee® compatible transmitter, or a Long Range (LoRa®) compatible transmitter) that transmits a location verification code to the access application which in turn forwards the location verification code to a remote verification system (e.g., a system hosted in a cloud computing environment). The verification system determines whether the location verification code matches the secure location or building the delivery person is currently requesting entry, and if so, transmits a lock code to the access application which is then used to unlock a door to permit access to the secure location.

However, if someone steals the beacon, that person could then potentially unlock the door for others when the person is not near the secure location. As such, a tamper proof beacon prevents someone from moving or stealing the beacon to continue to use the beacon to gain access to the secure location. While the beacon could be installed in a secure box or frame to prevent theft, this is expensive and can have a negative impact on the aesthetics of the secure location or building. Instead, in one embodiment, the beacon includes a radio frequency (RF) reader (e.g., a near field communication (NFC) reader or radio frequency identification (RFID) reader) which communicates with a RF tag (e.g., an NFC or RFID tag) disposed on a same surface as the beacon. For example, the beacon may cover the tag when attached to the surface. The reader in the beacon can periodically perform a read cycle to identify the presence of the tag to ensure the beacon has not been removed. If during one or more cycles the reader does not detect the tag, the beacon can deactivate the transmitter and no longer output the location verification code. Further, in some embodiments, the tag may be tamper proof such that the tag is rendered inoperable if removed from the mounting surface. Also, the tag may be uncloneable so a thief cannot make a clone of the tag to place near the beacon (after the beacon has been removed) to trick the reader into determine the beacon has not moved.

Figure 1:
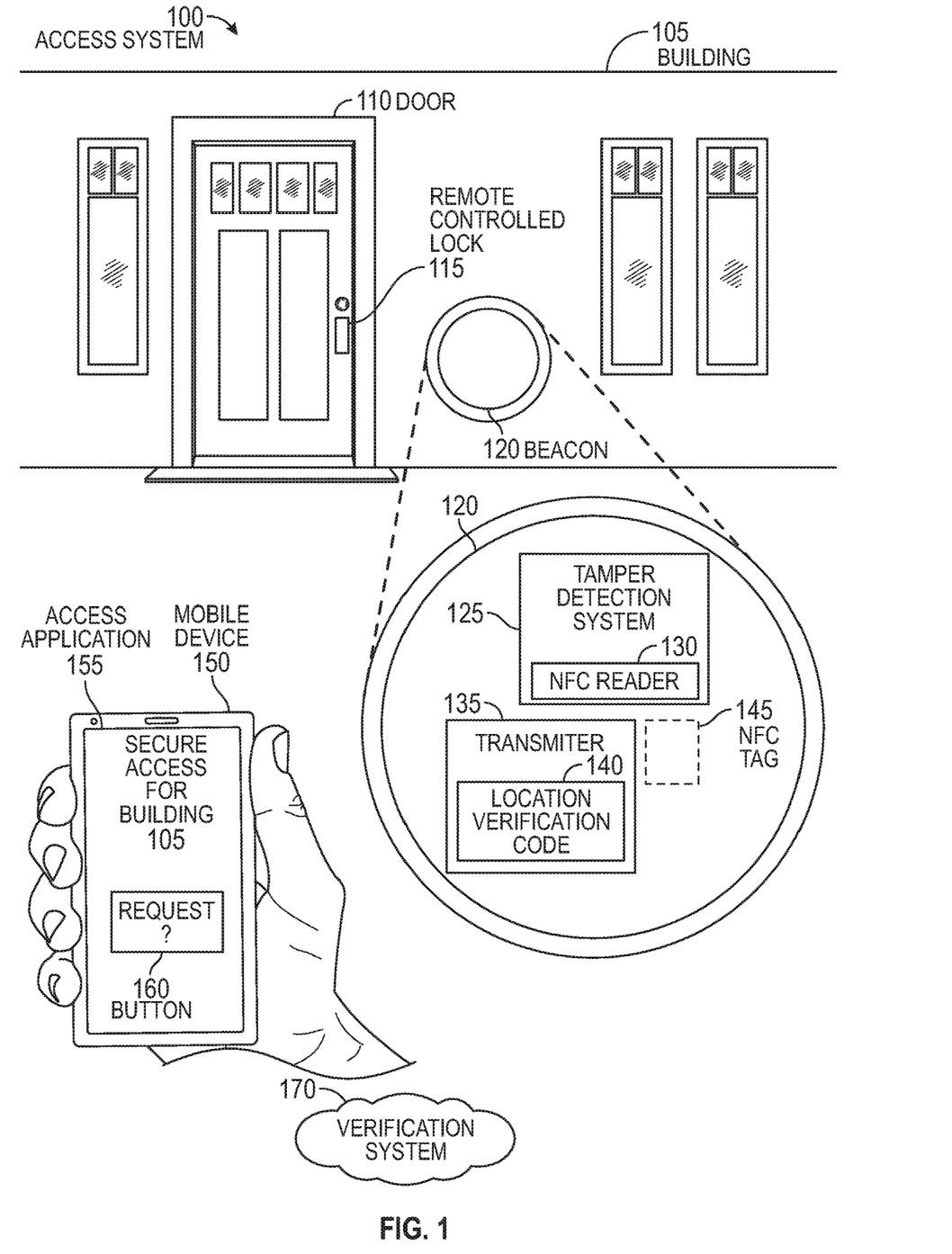
FIG. 1 illustrates an access system with a tamper proof beacon, according to various embodiments.

FIG. 1 illustrates an access system 100 with a tamper proof beacon 120, according to various embodiments. The access system 100 includes a secure building 105 that includes a remote controlled lock 115 on a door 110. While a building 105 with a locked door 110 is shown, the embodiments herein can be used with any type of secure location such as an apartment building, an office building, a warehouse, a gated community of houses, a fenced property, and the like. Instead of the door 110, the secure location may include a locked gate, dock door, or a storage box for holding packages. For example, rather than using the access system 100 to enter into the building, the delivery person can use the system 100 to unlock a box where she can place the package for delivery. Moreover, the access system 100 can be used to delivery any kind of items such as mail, food, packages, etc. Further still, the access system 100 is not limited to delivering items but could be used to provide general access to trusted individuals (e.g., a friend coming to visit someone who lives in the building 105, or a client visiting a manufacturing plant).

The beacon 120 enables an access application 155 on a mobile device 150 to verify the delivery person is proximate to the building 105. Put differently, the beacon 120 prevents the user carrying the mobile device 150 from being remote from the secure location but still being able to obtain a lock code for unlocking the door 110 (e.g., to let a friend into the building 105). To do so, the beacon includes a transmitter 135 (e.g., a Bluetooth® low energy (LE) compatible transmitter, a ZigBee® compatible transmitter, or a LoRa® transmitter) which transmits a location verification code 140 to the mobile device 150. Because the transmitter 135 has limited range, the access application 155 can receive the location verification code 140 only if the mobile device 150 is at the building 105 (e.g., within fifty feet of the beacon 120).

As shown, the access application 155 displays a button 160 which, when touched, instructs the access application 155 to store the location verification code 140. The access application 155 then transmits the location verification code 140 to a verification system 170 using, e.g., wireless communication such as a Wi-Fi or cellular network. The verification system 170 determines whether the location verification code 140 is authenticate and then unlocks the remote controlled lock 115. For example, the lock 115 may be an Internet-of-Things (IoT) device which is communicatively coupled to the verification system 170. In another embodiment, instead of unlocking the lock 115, the verification system 170 can transmit a lock code to the access application 155 which then either transmits the lock code to the lock 115 or displays the lock code which the delivery person can use on a keypad on the lock 115 to gain access to the building 105. In this manner, the beacon 120 can provide a location verification code 140 which is used to verify the mobile device 150 is at the secure location.

However, a person may steal or remove the beacon 120 from the building 105. For example, user can take the beacon 120, return home, and still use the access application 155 to unlock the door 110 even when she is not at the secure location. Although the beacon 120 could be installed in a secure fixture (e.g., a lock box or in a secure frame) doing so incurs substantial cost and may damage the building. Instead, the beacon 120 includes a tamper detection system 125 that deactivates the beacon 120 when removed from the building 105. Thus, the beacon 120 can be installed using a simple process such as using glue or adhesive to attach the beacon 120 to the building 105 and nonetheless prevent a nefarious actor who has the access application 155 from opening the door 110 when not at the building 105.

The tamper detection system 125 includes an NFC reader 130 which can communicate with an NFC tag 145. While the examples below describe an NFC reader 130 and NFC tag 145, the embodiments herein can be used with other radio frequency communication protocols such as an RFID reader and an RFID tag. In one embodiment, the NFC tag 145 is also attached to same wall of the building 105 but is attached between the beacon 120 and the building 105, such that the beacon 120 covers the NFC tag 145 (which is shown in ghosted lines).

At intervals, the NFC reader 130 queries or reads the NFC tag 145. If a person removes the beacon (e.g., detaches the beacon 120 from the building 105), the NFC reader 130 is unable to read or identify the NFC tag 145. An NFC reader 130 has a limited range, typically less than a few inches. Even if the NFC reader 130 (or an RFID reader) has a larger range, the power of the reader 130 can be reduced such that the read zone is only a few inches. Thus, once a person pries the beacon 120 off the building 105, moving the beacon 120 even a small distance away from the NFC tag 145 which is separately attached to the building 105 means the NFC reader 130 cannot communicate with the tag 145. As a result, the tamper detection system 125 deactivates the beacon 120 such that the beacon 120 no longer transmits the location verification code 140—e.g., the tamper detection system 125 deactivates the transmitter 135.

To prevent a person from removing the NFC tag 145 at the same time as the beacon 120, the NFC tag 145 may be tamper proof or resistant in that removing the NFC tag 145 from the building 105 alters or destroys its internal circuitry so the tag 145 can longer communicate with the NFC reader 130. Further, to prevent a person from cloning the NFC tag 145 and using a cloned tag to maintain communication with the NFC reader 130 after removing the beacon, the NFC tag 145 may be uncloneable. In this manner, the beacon 120 and the NFC tag 145 can be installed at the secure location using an easy and low cost technique and still prevent a person from continuing to use the beacon 120 to can access to the secure location even after the beacon 120 has been moved.

Figure 2:
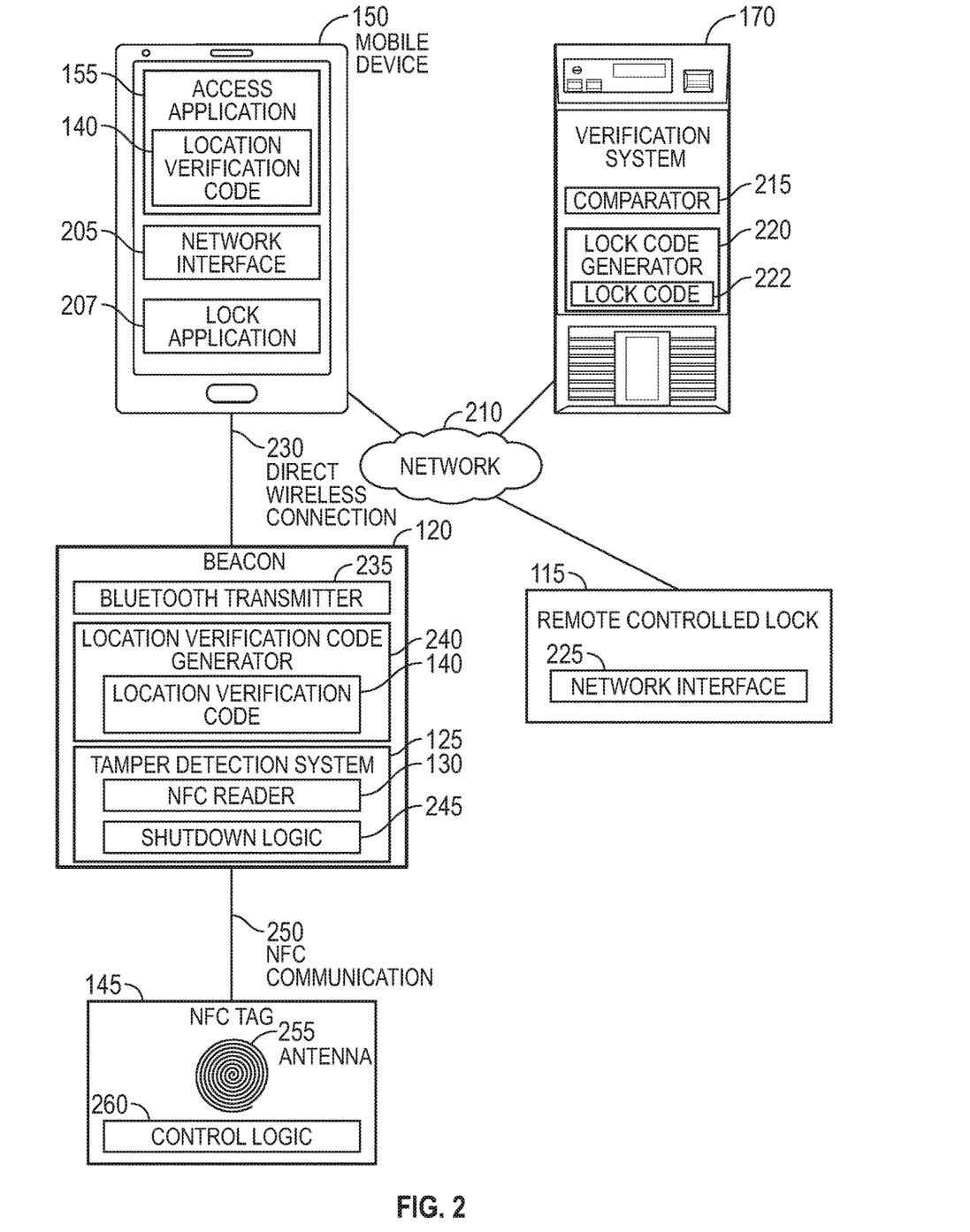
FIG. 2 illustrates an access system that uses the tamper proof beacon to verify a location of a mobile device, according to various embodiments.

FIG. 2 illustrates an access system for using the tamper proof beacon 120 to verify a location of a mobile device 150, according to various embodiments. FIG. 2 illustrates a network 210 which communicatively couples the mobile device 150 to the verification system 170 and the remote controlled lock 115 (e.g., an IoT device). The network 210 can include one or more public networks (e.g., the Internet), cellular networks, or Wi-Fi networks (e.g., a Wi-Fi network at the secure location).

In addition to the access application 155, the mobile device 150 includes a network interface 205 and a lock application 207. The network interface 205 permits the mobile device 150 to communicate with the network 210 as well as the beacon 120 using a direct wireless connection 230. For example, the network interface 205 may include a cellular transmitter which communicates with the network 210 and facilitates communication with the verification system 170 and the lock 115, as well as a receiver or transceiver for communicating with the beacon 120 using the direct wireless connection 230.

The lock application 207 is a software application that permits the mobile device 150 to unlock the lock 115. For example, after receiving a lock code 222 from the verification system 170, the lock application 207 can use the network 210 to transmit the lock code 222 to the remote controlled lock 115. As shown, the lock 115 includes a network interface 225 which permits the lock to receive the lock code 222 and then unlock. In one embodiment, the lock 115 may unlock the door for a certain amount of time (e.g., twenty seconds) before automatically locking the door, or the lock 115 may automatically relock the door once the door shuts after being opened. Doing so may prevent people from following the trusted user into the secure location.

In one embodiment, rather than unlocking a physical lock 115, the verification system 170 provides a code for deactivating a security system such as a light curtain or laser detection system. For example, rather than a physical door, a laser curtain may detect people who pass through an access point. If the delivery person passes through the access point with the security system enabled, an alarm may sound. However, once the location verification code 140 is verified, the verification system 170 can disable the security system which permits the delivery person to enter the secure location without triggering the alarm.

The verification system 170 may be remote computer (e.g., a server) or an application running in a cloud computing system or a data center. The verification system 170 includes a comparator 215 and a lock code generator 220. The comparator 215 may compare the location verification code 140 received from the access application 155 to an expected location verification code. The verification system 170 may verify access to multiple secure locations which each have a different beacon which uses a different location verification code. The comparator 215 can verify which beacon matches the location verification code 140 provided by the access application 155. The comparator 215 can then transmit a beacon ID to the lock code generator 220 which identifies to the lock code 222 of the lock 115 corresponding to the beacon. The lock code generator 220 can then transmit the lock code 222 to the mobile device 150. Alternatively, rather than using the lock application 207 on the mobile device 150, the verification system 170 can use the network 210 to send the lock code 222 to the lock 115 and unlocking the door for the delivery person once the location verification code 140 has been verified.

The beacon 120 includes a Bluetooth® transmitter 235, a location verification code generator 240, and the tamper detection system 125. Although Bluetooth LE is specifically shown, the transmitter 235 can use other types of communication techniques such as ZigBee or LoRa to transmit the location verification code 140 to the mobile device 150. In one embodiment, the beacon 120 is powered with a battery which means the transmitter 235 may use an energy efficient transmission scheme. In other embodiments, the beacon 120 can be coupled to an external power source (e.g., an electrical grid) which means the transmitter 235 can use less energy efficient transmission schemes.

The location verification code generator 240 provides the location verification code 140 to the transmitter 235. Although the location verification code 140 may be constant, this may reduce the security provided by using the beacon 120 since the user could store and then reuse the location verification code 140 to gain access to the secure location even when the mobile device 150 is outside the range of the transmitter 235. In other embodiments, the location verification code generator 240 changes the location verification code 140 over time. For example, the location verification code generator 240 can use a rotating scheme or other encryption technique to periodically change the location verification code 140. In one embodiment, the location verification code generator 240 is synchronized with the verification system 170 so that the comparator 215 knows what location verification code 140 was generated by the location verification code generator 240 at any given time. For example, when sending the location verification code 140 for verification, the access application 155 may also send a timestamp when the location verification code 140 was received from the beacon 120. Using the timestamp, the comparator 215 can determine what the location verification code should have been at the time listed in the timestamp and check whether the expected location verification code matches the location verification code 140 provided by the access application.

The tamper detection system 125 deactivates the beacon 120 in response to detecting a person has removed the beacon from its installed location. To do so, the system 125 includes the NFC reader 130 and shutdown logic 245. The NFC reader 130 uses NFC communication 250 to communicate with the NFC tag 145 which includes an antenna 255 and control logic 260. In one embodiment, the control logic 260 transmits a unique ID corresponding to the NFC tag 145 which the shutdown logic 245 can use to verify that the beacon 120 has not been moved. However, if the NFC reader 130 fails to communicate with the NFC tag 145 over one or more read cycles (e.g., fails to receive the ID of the tag 145), the shutdown logic 245 deactivates the beacon 120 as described in more detail below.

In one embodiment, the NFC tag 145 may have a battery or may be powered using the RF signals emitted by the NFC reader 130. Further, the NFC tag 145 may be tamper proof such that the control logic 260 is altered or is deactivated when removed from an attached surface. For example, the antenna 255 may be ripped or electrical components in the control logic 260 are broken when the tag 145 is removed. Moreover, the NFC tag 145 may be uncloneable which means the communication with the NFC reader 130 is encrypted or performed in such a way that the control logic 260 cannot be copied and then used to form a cloned NFC tag that behaves the same as the NFC tag 145.

Figure 3:
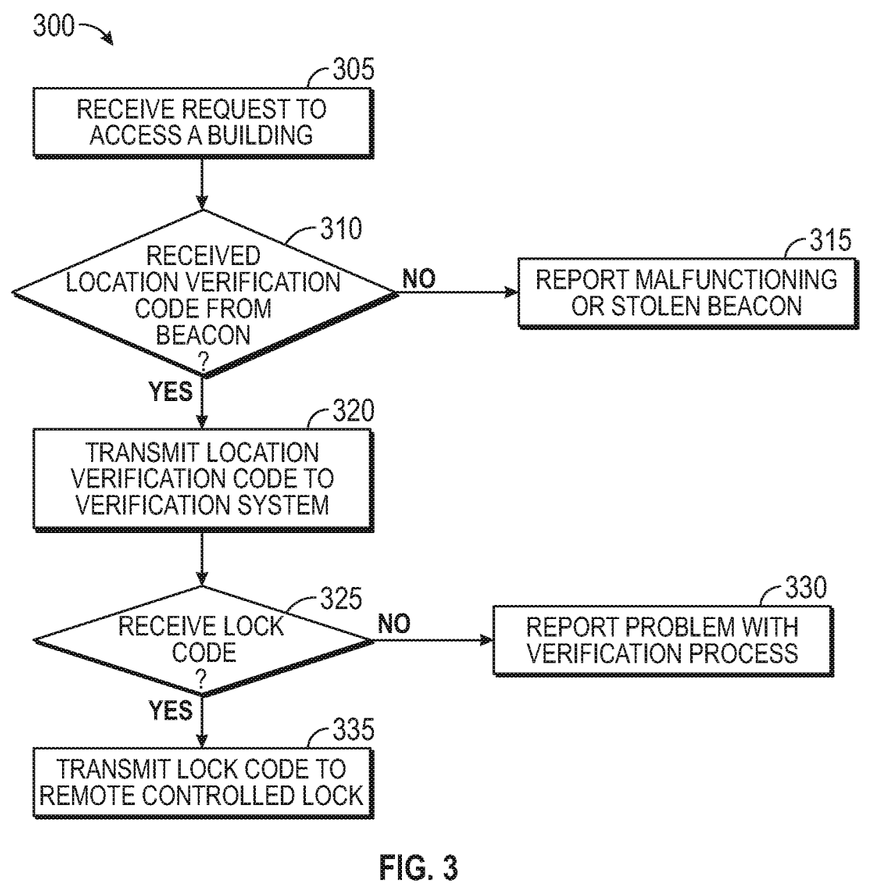
FIG. 3 is a flowchart for using the beacon to gain access to a secure location, according to various embodiments.

FIG. 3 is a flowchart of a method 300 for using the beacon to gain access to a secure building, according to various embodiments. For clarity, the blocks of the method 300 are discussed using the systems and components in the access system illustrated in FIG. 2. At block 305, the access application 155 receives a request to access a building. This request may be from a delivery person or other trusted individual which has the access application installed on her mobile device. As shown in FIG. 1, the user may tap the button 160 to indicate she is at the secure location and is ready for the access application 155 to unlock the door.

Although the access application 155 may be on a mobile device 150, in another embodiment the access application 155 may be installed on a delivery drone (e.g., an unmanned aerial vehicle (UAV) or autonomous car) that wants to enter the secure location to deliver an item, or for any other reason. In this example, the method 300 can be performed without any human interaction.

At block 310, the access application 155 determines whether the mobile device 150 has retrieved the location verification code 140 from the beacon 120. That is, the network interface 205 may scan the current RF environment to determine whether there is a beacon 120 in range that is transmitting a location verification code. If not, the method 300 proceeds to block 315 where the access application 155 reports that the beacon is malfunctioning or has been stolen. For example, the access application 155 may transmit a troubleshooting request to a system administrator in charge of maintaining the beacon 120 to let her know the beacon 120 needs to be repaired or replaced.

However, if the access application 155 receives the location verification code 140, the method 300 proceeds to block 320 where the mobile device 150 transmits the location verification code 140 to the verification system 170. As described above, the verification system 170 includes a comparator 215 which determines whether the received location verification code 140 matches an expected location verification code. To do so, the access application 155 may also transmit a timestamp and a beacon ID along with the location verification code 140. Using this information, the comparator 215 can generate, or look up in a database, the expected location verification code and determine whether the codes matches the retrieved location verification code. Assuming a match, the lock code generator 220 transmits the lock code 222 for the lock 115 which corresponds to the beacon 120. Like the location verification code, the lock code generator 220 may also continually change the lock code 222 so that the user cannot store and then reuse the lock code 222 to gain access to the secure location without the verification system 170 first verifying the mobile device 150 is at the location. However, if the verification system 170 transmits the lock code 222 to the lock 115 rather than to the mobile device 150, the lock code 222 may remain constant.

At block 325, the access application 155 determines whether the lock code 222 was received from the verification system 170. If the location verification code 140 does not match the expected location verification code, the verification system 170 does not transmit the lock code 222 to the access application 155, or transmits an indication that the verification process failed. In any case, the method 400 proceeds to block 330 where the access application 155 reports a problem with the verification process. For example, the comparator 215 may be out of synch with the location verification code generator 240 which means the location verification code 140 generated by the beacon 120 does not match the expected location verification code generated by the comparator 215.

However, if the verification process was successful and the mobile device 150 receives the lock code 222, the method 300 proceeds to block 335 where the lock application 207 transmits the lock code 222 to the remote controlled lock 115 which unlocks an access point into the secure location (e.g., a door, gate, lock box, flap, etc.). Alternatively, the lock application 207 may display the lock code 222 which the delivery person types into a keypad associated with the lock 115 to unlock the access point.

Figure 4:
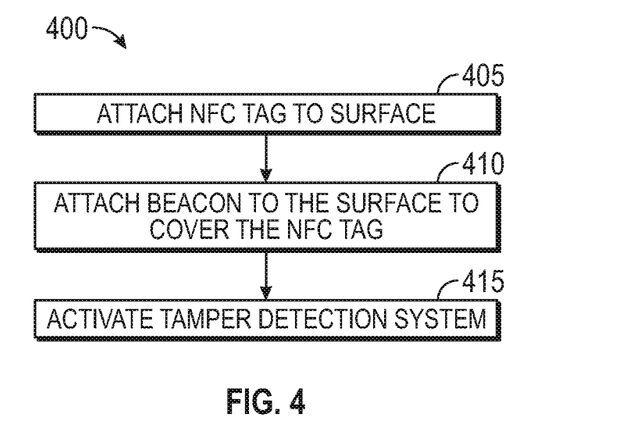
FIG. 4 is a flowchart for attaching a tamper proof beacon to a surface, according to various embodiments.
Figure 5A:
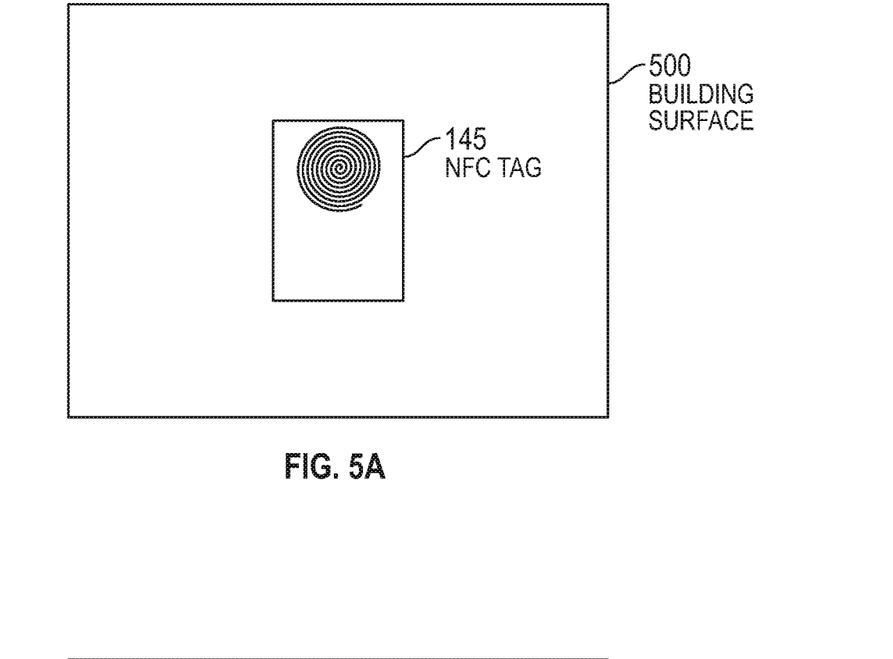
FIGS. 5A and 5B illustrate attaching a radio frequency tag and a beacon to a surface, according to various embodiments.

FIG. 4 is a flowchart of a method 400 for attaching a tamper proof beacon to a surface, according to various embodiments. For clarity, the method 400 is discussed in parallel with FIGS. 5A and 5B which illustrate attaching an RF tag (e.g., NFC tag 145) and the beacon 120 to a surface 500, according to various embodiments. At block 405, a technician attaches the NFC tag 145 to the surface 500 as illustrated in FIG. 5A. For example, one side of the NFC tag 145 may include a removable film which covers an adhesive. By removing the film, the technician can attach the tag 145 to the surface 500. In another example, the technician first applies glue or epoxy to the surface 500 and then attaches the NFC tag 145 to the surface 500 using glue or epoxy.

As mentioned above, the NFC tag 145 may be tamper proof meaning that the tag 145 no longer functions when removed from the building surface 500. For example, in addition to attaching the tag 145 to the surface 500, the adhesive may also attach to critical components or circuitry in the tag 145. As such, if a person attempts to peel the tag 145 off the surface 500, the critical components attached to the adhesive remain attached to the surface and rip away from the tag 145. As a result, the tag 145 is unable to communicate with an NFC reader. However, the embodiments herein are not limited to using tamper proof tags and can use a tag 145 that is not tamper proof to detect when the beacon 120 has been removed from the surface 500.

Figure 5B:
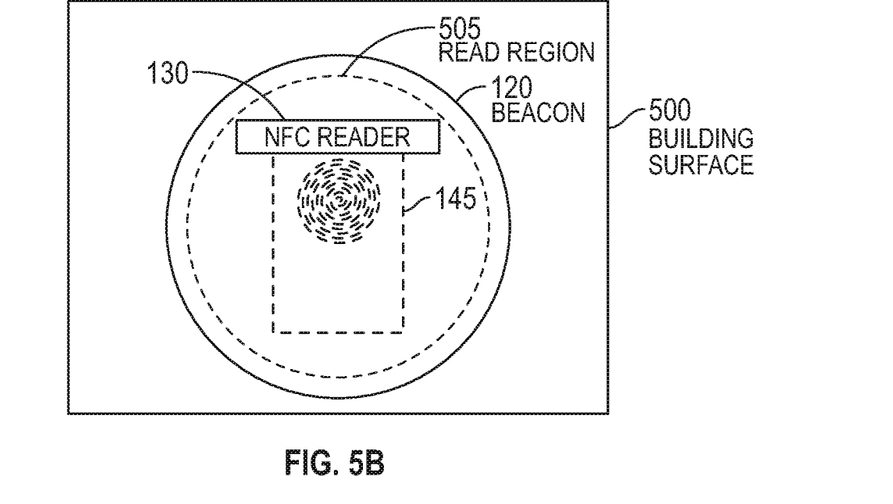

At block 410, the technician attaches the beacon 120 to the surface 500 to cover the NFC tag 410 as illustrated in FIG. 5B. Covering the tag means that the beacon 120 must first be removed before a person can then access the tag 145. However, if a tamper proof tag 145 is used, the beacon 120 may not cover the tag 145 since a thief cannot remove the tag 145 without destroying its functionality. In FIG. 5B, the tag 145 is shown in ghosted lines to illustrate that a body of the beacon 120 covers the tag 145 (e.g., the tag 145 is not visible).

At block 415, the technician activates the tamper detection system in the beacon 120. When doing so, the NFC reader 130 is activated and begins to query the tag 145 to ensure the beacon 120 remains attached to the surface 500 as shown in FIG. 5B. In one embodiment, the NFC reader 130 may be pre-programmed to know which tag 145 the reader 130 should be communicating with when activated. For example, the NFC reader 130 and the tag 145 may be paired and sent in the same installation package. If when activated the NFC reader 130 does not detect the expected tag 145, the beacon 120 may output an indication to the technician that something went wrong during the installation process.

However, in another embodiment, the NFC reader 130 is programmed to store the ID of the tag 145 when first activated. That is, so long as only one NFC tag 145 is in communication with the reader 130 when first activated, the NFC reader 130 saves the ID of the tag 145 and assumes the tag 145 is the tag the reader 130 should continually monitor in order to determine when the beacon 120 has been removed from the surface 500.

Further, FIG. 5B illustrates a read region 505 of the NFC reader 130 which can be adjusted by changing, e.g., the output power of the reader 130. In one embodiment, the read region 505 is set so the NFC reader 130 can only read tags disposed at the back of the beacon 120—e.g., a side of the beacon 120 facing the building surface 500. Thus, if a person who was trying to steal the beacon 120 brought a cloned tag to the front side of the beacon 120, the NFC reader 130 is unable to read the cloned tag, and thus, once the beacon 120 is removed, the tamper detection system can disable the beacon 120. Again, although FIGS. 5A and 5B illustrates an NFC tag 145 and NFC reader 130, the embodiments herein can also be used with an RFID tag and RFID reader. Although the read region of an RFID reader is typically larger than the NFC reader 130, the power can be reduced so that an RFID reader has smaller read region like the one shown in FIG. 5B.

Returning to method 400, at block 415, the technician activates the tamper detection system. This may include activating the NFC reader in the beacon and ensuring the reader can detect the NFC tag. If not, the beacon may output negative feedback (e.g., a beep or flashing red light) which informs the technician that the tamper detection system cannot detect an NFC tag. Otherwise, the beacon can provide positive feedback such as a green light indicating the tamper detection system is active.

Figure 6:
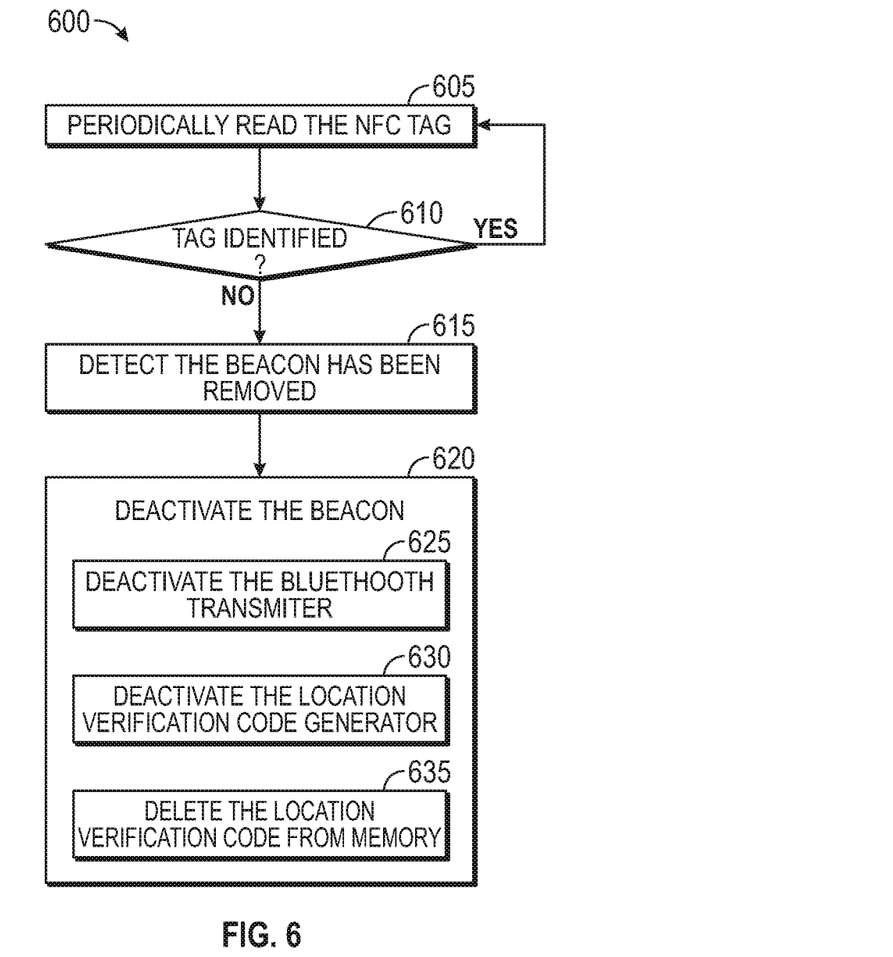
FIG. 6 is a flowchart for detecting when a beacon has been removed, according to various embodiments.

FIG. 6 is a flowchart of a method 600 for detecting when a beacon has been removed, according to various embodiments. At block 605, the NFC reader in the tamper detection system periodically reads the NFC tag. That is, the NFC reader performs a read cycle which may include transmitting a query message to the NFC tag and receiving a reply from the NFC tag. This reply may include a unique ID associated with the tag.

The frequency at which the NFC reader reads the NFC tag can vary. Increasing the frequency may permit the tamper detection system to determine sooner when the beacon has been removed. Also, reading the NFC tag more frequently makes it harder for a thief to remove the beacon and then move a cloned tag into position to be read by the NFC tag. Put differently, if the NFC reader reads the NFC tag once every five seconds, a person could pry the beacon from the attached surface and move a cloned NFC tag (assuming the NFC tag is cloneable) into position so that the NFC reader reads the cloned tag and assumes the beacon is still attached to the surface. However, if the NFC reader queries the tag every second, a person may not have time to remove the beacon and move another tag into range of the NFC reader before the NFC readers detects that a tag is no longer within its read region. Nonetheless, increasing the frequency of the read cycles may be balanced against power consumption which may be a factor if the beacon relies on battery power to operate the tamper detection system and the transmitter.

Moreover, as mentioned above, the NFC tag may be uncloneable such that a nefarious actor cannot move her own NFC reader in range of the NFC tag and capture information which can be used to create a cloned version of the NFC tag. In that case, the NFC reader may query the NFC tag less frequency. Also, the tag can be tamper proof such that the tag is deactivated if removed from the attached surface.

At block 610, the NFC reader determines whether the correct NFC tag was identified. If so, the method 400 returns to block 605. However, if the NFC reader fails to read any tag, or detects a different NFC tag, the method 400 proceeds to block 610. In one embodiment, the tamper detection system waits until the NFC reader is unable to communicate with the correct NFC tag over multiple read cycles before proceeding to block 615 to ensure the beacon has actually been removed rather than a temporary RF condition that prevented the reader from detecting the tag during a read cycle.

At block 615, the tamper detection system determines that the beacon has been removed. Put differently, the NFC tag is no longer within the read region of the NFC reader indicating that an unauthorized person has removed the beacon from its intended location.

At block 620, the shutdown logic in the tamper detection system deactivates the beacon. In one embodiment, deactivating the beacon results in the beacon no longer transmitting the correct location verification code. As illustrated in FIG. 6 there are several different ways the shutdown logic can deactivate the beacon. At block 625, the shutdown logic deactivates the transmitter which can include turning off the transmitter or cutting off power to the transmitter.

At block 630, the shutdown logic deactivates the location verification code generator. As a result, the generator may not provide any location verification code. As a result, without the correct location verification code, the access application cannot obtain a lock code from the verification system. In one embodiment, instead of not providing any location verification code, the location verification code generator provides a tamper detection code to the transmitter which is then provided to the access application. The access application forwards the tamper detection code to the verification system which can then determine that the beacon has been moved and alert a technician. Put differently, the tamper detection system can use the tamper detection code (and the access application) to alert a system administrator that the beacon has been removed. In this manner, the tamper detection system can leverage the network connection of the mobile device executing the access application to inform the verification system that the beacon has been removed and that the verification system should no longer issue lock code for access applications communicating with the beacon.

At block 635, the shutdown logic deletes the location verification code(s) from memory in the beacon. For example, the beacon may include a list of location verification codes or data which can be used to generate the location verification code. The shutdown logic can delete this data so the nefarious actor who removed the beacon cannot generate their own location verification codes to gain access into the secure location.

The blocks 625, 630, and 635 are only some of the actions the shutdown logic can perform in response to determining the beacon has been removed. The shutdown logic can perform only one, or a combination, of these actions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the verification system) or related data available in the cloud. For example, the verification system could execute on a computing system in the cloud and verify that the location verification codes indicate that a person is at the secure location. In such a case, the verification system could verify the location verification codes and store lock codes at a storage location in the cloud. Doing so allows the access applications to access this information using a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system comprising:
a near field communication (NFC) tag; and
a beacon comprising:
   a transmitter configured to transmit a location verification code for accessing a secure location to an external device;
   a tamper detection system configured to determine when the beacon has been moved, the tamper detection system comprising:
     an NFC reader configured to periodically read the NFC tag; and
     shutdown logic configured to deactivate the beacon in response to the NFC reader being unable to read the NFC tag,
wherein the beacon and the NFC tag are attached to a same surface, wherein the NFC tag is disposed between a portion of the beacon and the same surface such that the beacon covers the NFC tag.

2. The system of claim 1, further comprising:
a verification system that is external to the beacon, wherein the verification system is configured to:

receive the location verification code from the external device, verify that the location verification code originating from the beacon, and transmit a lock code for unlocking an access point at the secure location.

3. The system of claim 2, wherein the beacon further comprises:

a location verification code generator configured to change the location verification code over time, wherein the location verification code generator is synchronized with the verification system.

4. The system of claim 1, wherein the NFC tag is uncloneable and tamper proof.

5. A method, comprising:

transmitting, from a beacon, a location verification code associated with a secure location;

identifying, using the beacon, a radio frequency tag during a first read cycle, wherein the beacon and the radio frequency tag are attached to a same surface, wherein the radio frequency tag is disposed between a portion of the beacon and the same surface such that the beacon covers the radio frequency tag;

failing to identify, using the beacon, the radio frequency tag during a second read cycle following the first read cycle; and deactivating the beacon.

6. The method of claim 5, wherein the first and second read cycles are performed using a reader disposed in the beacon.

7. The method of claim 6, wherein the reader is one of an NFC reader and an RFID reader.

8. The method of claim 5, wherein deactivating the beacon comprises at least one of:

deactivating a transmitter in the beacon transmitting the location verification code;

deactivating a location verification code generator which generates the location verification code; and deleting the location verification code from memory in the beacon.

9. The method of claim 5, wherein the location verification code is configured to be used by a verification system to verify a location of a user before permitting the user to enter the secure location.

10. The method of claim 5, further comprising:

failing to identify, using the beacon, the radio frequency tag during a third read cycle following the second read cycle, wherein deactivating the beacon is performed after the second and third read cycles.

11. The method of claim 5, wherein deactivating the beacon comprises:

determining, based at least on part on the second read cycle, that the beacon has been removed from an original installed location.

\* \* \* \* \*